United States Patent [19]

Upmeier et al.

[11] 4,246,212
[45] Jan. 20, 1981

[54] METHOD AND APPARATUS FOR OPTIMIZING THE OUTPUT OF A BLOWN FILM EXTRUDER PLANT BY MEANS OF A PROCESS COMPUTER

[75] Inventors: Hartmut Upmeier; Helmut Helbig; Werner J. Zimmermann; Gerhard Winkler, all of Lengerich; Ferdinand Löning, Weener, all of Fed. Rep. of Germany

[73] Assignee: Windmoller & Holscher, Lengerich, Fed. Rep. of Germany

[21] Appl. No.: 29,929

[22] Filed: Apr. 13, 1979

[30] Foreign Application Priority Data

Apr. 17, 1978 [DE] Fed. Rep. of Germany ....... 2816583

[51] Int. Cl.³ .................................... B29D 23/04
[52] U.S. Cl. .............................. 264/40.1; 264/40.6; 264/40.7; 264/564; 264/569; 425/72 R; 425/140; 425/141; 425/143; 425/326.1
[58] Field of Search ............... 264/563, 564, 565, 569, 264/40.1, 40.3, 40.7, 40.6; 425/140, 141, 143, 72 R, 326.1

[56] References Cited

U.S. PATENT DOCUMENTS

| 3,231,651 | 1/1966 | Cheney | 264/564 |
| 3,286,302 | 11/1966 | Doering | 425/141 |
| 3,576,935 | 4/1971 | Dyer et al. | 264/563 |
| 3,775,035 | 11/1973 | Scotto et al. | 425/141 |
| 4,101,614 | 7/1978 | Havens | 425/143 |

Primary Examiner—Jeffery R. Thurlow
Attorney, Agent, or Firm—Fleit & Jacobson

[57] ABSTRACT

In a film blowing plant comprising an extruder for the melt, a film blowhead, calibrating means for the blown tubular film, oscillatory take-off means for the film and a coiler for the flattened film, the output of the plant is set to an optimum figure by a process computer controlling the width and thickness of the film. The height of the line of solidification of the film above the blowhead is measured and, in response to a departure of this height from a given desired value, the output of the extruder is increased or reduced as the case may be.

17 Claims, 6 Drawing Figures

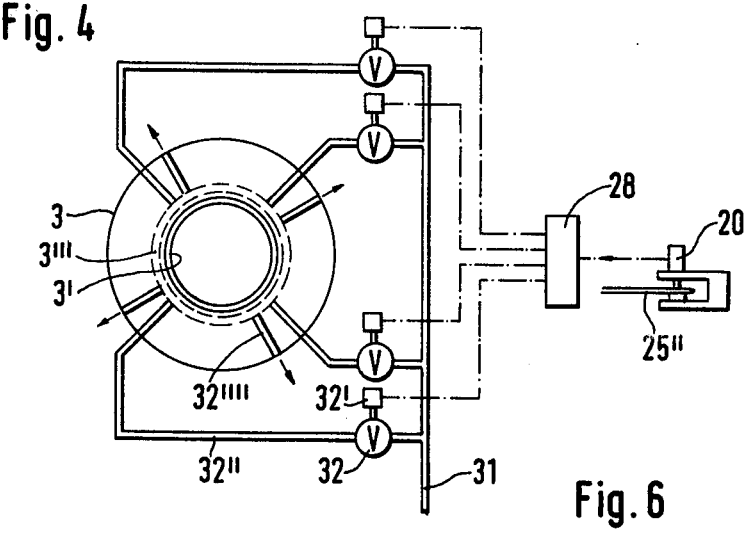
Fig. 4
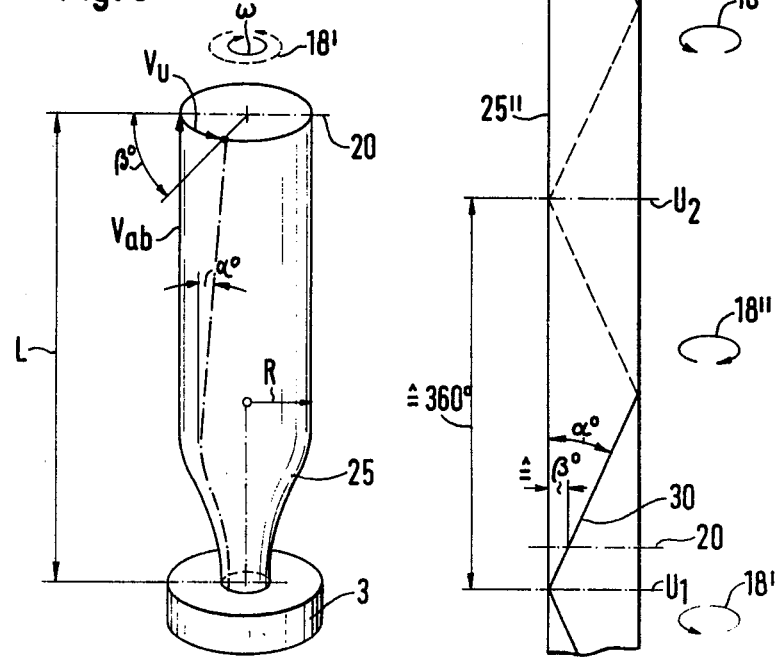
Fig. 5
Fig. 6

METHOD AND APPARATUS FOR OPTIMIZING THE OUTPUT OF A BLOWN FILM EXTRUDER PLANT BY MEANS OF A PROCESS COMPUTER

The invention relates to a method for optimizing the output of a film blowing plant comprising an extruder, a film blowhead, film calibrating means, reversing film take-off means and a coiler for the flattened tubular film, by using a process computer controlling the film width and thickness.

In the operation of film blowing plants it is an obvious desire that they should work with the highest efficiency, i.e. the highest possible output and the lowest possible input of material. The output of the film blowing plant is limited by the cooling-off speed of the tubular bubble because the film calibrating and take-off means can be arranged only above the line of solidification of the film or the so-called frost line. The attainable output of the film blowing plant is therefore decisively dependent on the performance of the cooling means for the extruded tubular film. Since air is usually used as the cooling medium for cooling the film bubble in blown film extruder plants, the output of such plants is highly dependent on the fluctuation of air temperatures between day and night, unless the air temperature in the extruder building is kept constant by expensive air-conditioning or air-cooling installations. It is also known to cool the cooling air that is sucked-in for cooling the film by means of an air refrigerator but, because of the temperature fluctuations arising during the course of a day in the air within the building, output fluctuations arise which are unavoidable despite the cooled air used for cooling the film.

It is the problem of the present invention to optimize the output of film blowing installations according to the cooling effect depending on the temperature of the surrounding air and the temperature of the cooling air.

According to the invention, this problem is solved in a method of the aforementioned kind in that the height of the line of solidification of the film above the blowhead is measured and, according to its departure from a desired value, the extruder output is increased or reduced. For this purpose a desired value is given which corresponds to the highest output. This desired value is to a large extent governed by the fact that the lower supporting elements of the film calibrating means surrounding the tubular bubble must be disposed at the level of the frost line. If the frost line is located considerably below the lowermost supporting element of the film calibrating means, the diameter of the film bubble is reduced, so that the tubular film no longer comes to lie against the film calibrating means and undesired departures in the width of the flattened tubular film are produced. If the frost line is located considerably above the lowermost supporting element of the film calibrating means, undesirable bulging of the tubular bubble can be observed beneath the film calibrating means. According to the method of the invention, the height of the line of solidification of the film is measured, compared with a desired value corresponding to the maximum output of the plant and, according to the detected departure, the extruder output is increased or reduced and the lowermost supporting element of the film calibrating means is set to the optimum height of the line of film solidification. According to the method of the invention, the measured height of the line of film solidification serves as a criterion for how far the actual output is removed from the maximum output. By using a process computer, the method of the invention therefore permits the output of the film blowing plant to be optimized with the aid of a simply detectable parameter, namely the height of the line of film solidification.

The height of the line of film solidification can be determined by measuring the diameter of the tubular bubble or by sensors which scan the temperature of the wall of the tubular bubble.

Every change in the output of the extruder results in different temperatures of the mass, pressures of the mass and thus changes in the viscosity of the extruded material that can influence the film thickness. It is known that optimum tolerances in film thickness can be maintained with a substantially constant extruder output. Thus, if the extruder output is changed, it is usually also necessary to recentre the film blowhead to avoid deterioration in the tolerances for the film thickness. However, the film thicknesses do not usually change uniformly over the periphery of the tubular bubble; instead, peripheral regions are formed having greater and smaller film thicknesses. Optimizing the output of the film blowing plant therefore presents the further problem of improving the film quality and at the same time reducing the input of material in that not only the mean film thickness measured over the periphery of the tube but also the thickness in all peripheral regions of the film should be near the lower limit for the film thickness tolerance.

This further problem is solved according to a further embodiment of the invention in that the film thickness is measured along the periphery of the tubular film and the associated region of the nozzle ring of the film blowhead is influenced according to the departure from the mean film thickness. It is particularly simple and effective if influencing is effected by temperature changes. In the vicinity of the nozzle ring in which cooling takes place, the temperature of the melt is reduced and as a result the stretchability of the as yet plastic film is reduced below the frost line, whereby the film remains thicker. In the method of the invention steps should be taken so that during measurement of the thickness of the film and determination of the region of the nozzle ring that was previously left by the measuring position compensation is made for the angle of twist resulting from the reversing film take-off means.

A process computer conventionally detects the measured film thickness and transmits the computed correcting commands to the associated servo-elements.

Advantageous embodiments of the invention have been described in more detail in the subsidiary claims.

An example of the invention will now be described in more detail with reference to the drawing, wherein:

FIG. 2 is a diagrammatic representation of the means for measuring, monitoring and possibly correcting the film width;

FIG. 3 is a diagrammatic representation of the means for measuring, monitoring and possibly correcting the film thickness;

FIG. 4 is a diagrammatic plan view of the film blowhead with means for sectionally cooling the nozzle ring and FIGS. 5 and 6 are diagrammatic representations of the twisting of the tubular bubble resulting from the reversing film take-off means.

Figure 1:
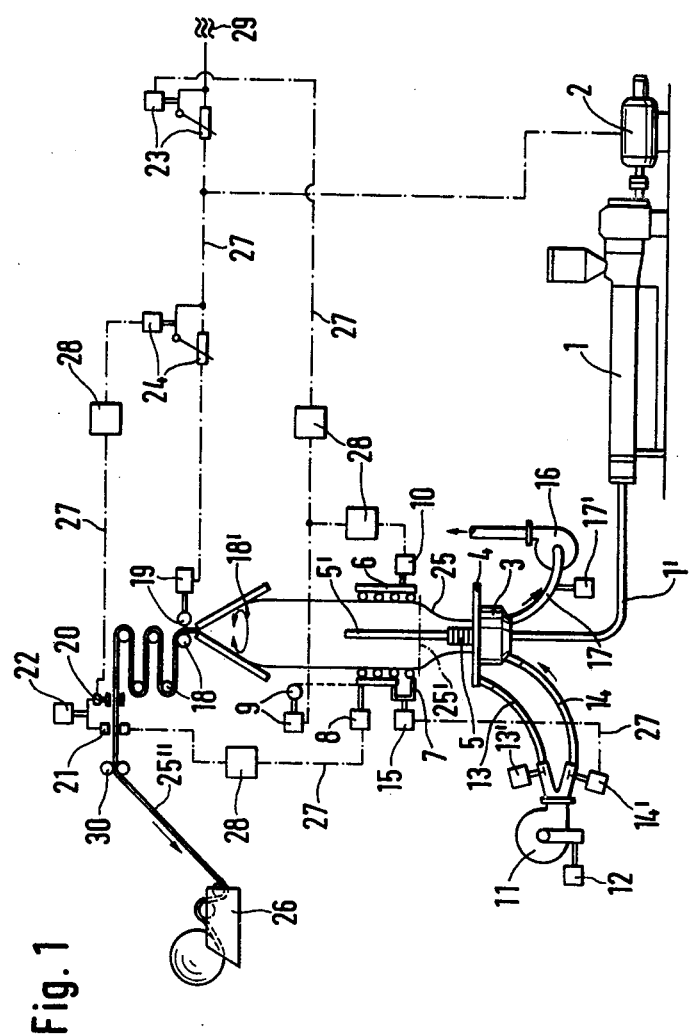
FIG. 1 is a diagrammatic representation of a film blowing plant with means for optimizing the output and controlling the film thickness within predetermined tolerances.

The extruder 1 with main drive motor 2 conveys and plasticizes the melt of the thermoplastic material which is to be processed and which is fed by the diagrammatically illustrated connection 1' into the film blowhead 3 with the outer cooling ring 4 and inner cooling apparatus 5 and is formed into the tubular film 25. At the level of the line 25' of film solidification there are film calibrating means 6 which are shown in simplified form and prescribe the diameter and thus the film width of the flattened tubular film 25". These means are followed by the reversing film take-off means 18 comprising the take-off drive 19, the to and fro reversing motion through about 360° being indicated by the directional arrow 18'. Downstream of the reversing means 18 there are the film thickness measuring means 20, the film width measuring means 21, the downstream film take-off 30 and the coiler 26 shown in simplified form for the flattened web of film 25".

The cooling air for the film is centrally conveyed by the cooling air blower 11, the amounts of cooling air being set by the motor-actuated throttle valve 12 at the suction connection, by the motor-actuated throttle valve 13' at the cooling air conduit 13 leading to the outer cooling ring 4, and by the motor-actuated throttle valve 14' at the cooling air conduit 14 for the inner cooling apparatus 5. The heated cooling air internally of the film is withdrawn through the suction tube 5', the connecting conduit 17 and the motor-actuated discharge throttle valve 17' by the blower 16.

By means of the different positionable servo-drives, the starting and production positions of the following components of the plant should be brought to the correct position:

The starting speed of the extruder and the subsequent production speed is prescribed by the motor potentiometer 23, the power supply for the main drive motor 2 being indicated in simplified form by the A.C. symbol 29.

Depending on the desired film thickness, the drive motor for the take-off rollers 19 is coupled to the main drive motor 2 by way of the motor potentiometer 23 so that the speed of the take-off motor 19 will always vary in a predetermined relationship to the main drive motor 2.

The conditions of the cooling air supply and withdrawal are prescribed by the positioning drives 12, 13' and 17' depending on the intended film production rate, the motor-driven throttle valve 14' for the internal cooling air of the film being controlled by the sensing arm 7 of the film calibrating apparatus 6 by way of the regulator 15.

The diameter and thus the film width is determined by the film calibrating means 6 which are brought to the starting or production position by the positioning drive 8 according to width and by the positioning drive 9 according to height.

The measuring systems 20 and 21 for measuring the film thickness and film width are brought to the correct operation position by the common positioning drive 22.

The chain-dotted connecting lines 27 in FIGS. 1 to 4 indicate the functional linking of the measuring and servo-elements to the process computer 28.

Figures 2, 3:
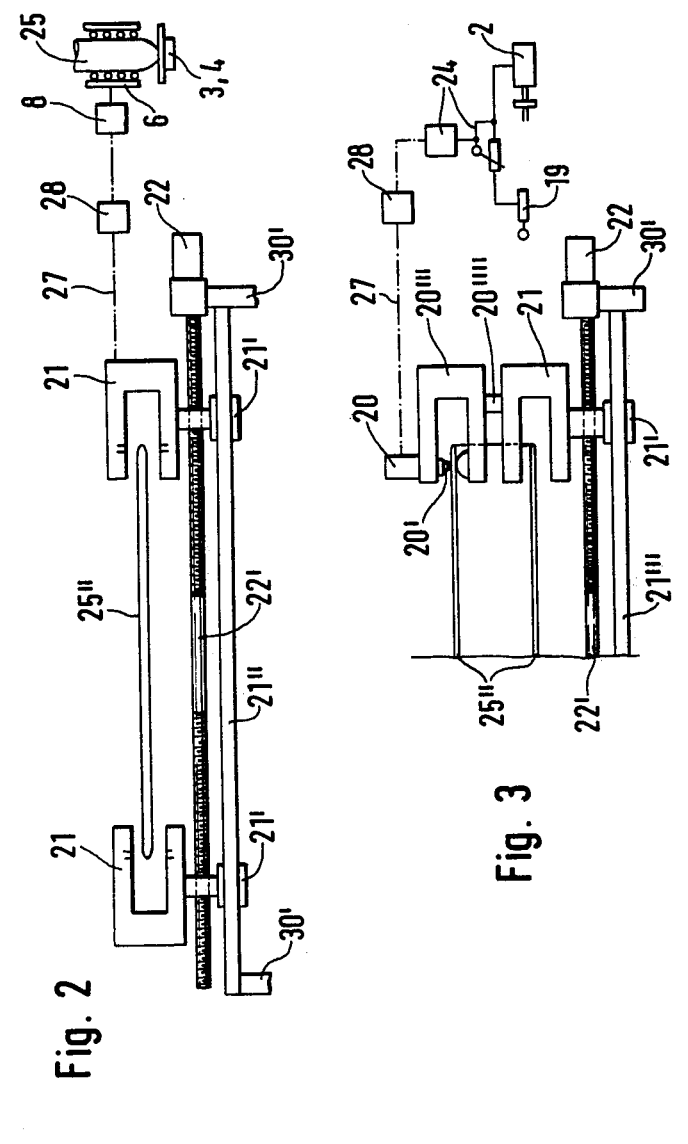

FIG. 2 illustrates the measurement of the width of the flattened tubular film 25" by means of the sensing heads 21 which are set to the preselected film width for example by means of the screw-threaded spindle 22' and the slide shoes 21' on the measuring head holder 21'. The measuring head holder 21" can for example be disposed on the side frames 30' of the feed 30 behind the film reversing apparatus 18.

The measuring signals of the two measuring heads 21 are evaluated by the process computer 28 and, in the case of departures from the desired width, the diameter of the film calibrating means 6 and thus the width of the flattened tubular film 25" is appropriately corrected by means of the servo-drive 8.

The measuring heads 21 can be the usual measuring heads employed for pneumatically operating side edge controls. However, it is also possible to employ other measuring heads, for example those on an infra-red basis or with radiation from radio isotopes.

FIG. 3 illustrates mechanically operating thickness measuring means. On one of the thickness measuring heads 21 above the holder 20"" and the measuring yoke 20'" there are held the mechanically operating measuring sensors 20', 20". The thickness measurement of the latter is evaluated by the process computer 28 by way of the electric converter 20 and, upon a departure from the desired thickness, is compensated by appropriate adjustment of the motor coupling potentiometer 24 between the main drive 2 of the extruder and the take-off drive 19. The thickness measuring means 20-20"" measures the double film thickness in the vicinity of the side fold of the flattened tubular film 25". By reason of the reversing film take-off, all parts of the film pass under the measuring tongs 20', 20" so that the thickness of the film is detected in a simple manner over the entire periphery of the tubular film.

However, it is also possible to use conventional thickness measuring means on an infra-red basis or with isotope radiation.

By means of the described measuring and regulating system, the mean film thickness and the film width can be automatically monitored in known manner.

Depending on the extruder output and film dimensions, a particular film height above the film blowhead 3, 4 is obtained for the frost line 25' and this must move within predetermined limits. To enable the blown film extruder plant to be operated with a maximum output depending on the existing daytime temperature, the height of the frost line above the film blowhead is employed as a measuring parameter. The first calibrating and supporting rings of the film calibrating means 6 should be so set that they touch the film bubble 25 precisely at the level of the frost line 25'. Depending on the material being processed, the film thickness and film width, the frost line 25' can extend up to a predetermined maximum value. If the frost line 25' is disposed above the predetermined maximum value, the extruder output has to be reduced. If the frost line 25' is disposed below the predetermined maximum value, the extruder may be operated at a higher output.

It is known that, depending on the material being processed, the region of the frost line corresponds to a particular solidification temperature. By means of a suitable temperature sensor 10 which can operate with infra-red radiation or consist of a contact thermo-element, the height of the frost line is measured and, by way of the process computer 28 and the servo-drive 9, the height of the calibrating means 6 is corrected correspondingly.

Since the blown film extruder plant as described is equipped with film calibrating means, the height of the frost line can also be detected in an indirect manner. For this purpose, the following phenomena may be utilized:

If the frost line is located precisely at the lowermost supporting ring of the film calibrating means, the film has an exact 'bottle neck shape' and runs into the supporting elements of the calibrating apparatus in alignment.

If the frost line is disposed considerably below the lowermost supporting ring of the film calibrating means, the diameter of the film bubble becomes smaller so that the tubular film will no longer touch the supporting rings of the film calibrating means.

If the frost line is disposed considerably above the lowermost supporting ring of the film calibrating apparatus, one can observe that the entering neck of the tubular bubble bulges below the lowermost supporting ring of the calibrating means.

The diameter sensor 7 of the film calibrating means follows this movement of the neck of the tubular film. The position of the sensing arm can be measured by way of initiators. If the sensing arm exhibits a constant departure of the position towards the outside, a setting command is given by the process computer and as a result of this the film calibrating means are moved higher. However, if the sensing means exhibit a constant departure in the position towards the inside, the process computer delivers a setting signal as a result of which the film calibrating means are adjusted downwardly towards the film blowhead.

Maximizing of the output is achieved in that the process computer 28 compares the existing height of the film calibrating means with the predetermined maximum height and, by means of the motor potentiometer 23 for the main drive 2 of the extruder 1, the output of the latter is correspondingly adjusted.

In this way it is possible to utilize the maximum height of the film calibrating means to achieve the highest possible output.

As already explained, the film thickness tolerances are unfavourably affected by the changing conditions in the extruder 1. For this reason the film thickness tolerances have to be evened out. To eliminate thin positions in the film, cooling sections are provided over regions of the periphery of the nozzle ring of the film blowhead, preferably at the outer nozzle ring. However, it is also possible to use other servo-elements, for example servo-screws actuated by a gear motor or expansion members influenced by a controlled temperature guide. In the system described hereinafter, with the nozzle ring that can be cooled in peripheral regions, one utilizes the effect that, on cooling a peripheral region of the nozzle ring, the temperature of the melt is reduced in this region and thus the stretchability of the film is reduced so that the film remains thicker.

Every peripheral region 3''' of the nozzle ring 3 receives, for example, compressed air as a cooling medium through the connecting conduit 32'' which, by way of the regulating valve 32 with the servo-drive 32', dispenses the amount of cooling air discharged through the outlet bore 32'''' after heating.

FIG. 4 diagrammatically illustrates a nozzle ring with four cooling sections distributed over its periphery. The thickness sensor 20 scans the edge fold of the flattened web of film 25' and gives a corresponding measuring signal to the process computer 28 which delivers corresponding setting commands to the respective motor servo-valves 32, 32'.

Even the latest film blowhead with helical distributor gives rise to thick and thin portions in the film thickness as a result of its constructional features, and this despite being designed with the aid of an electronic data processing computer programme. For example if the film blowhead has a quadruple distributing helix, four thick and four thin portions occur in the film thickness at accurately defined positions. It is therefore desirable to equip the nozzle ring with at least twice as many cooling chambers as there are distributing helices so that by way of the cooling chambers one can achieve control of the film thickness on the basis of which one can influence the four thin portions by means of the corresponding cooling sections in the sense of a larger film thickness.

Regulation of the mean film thickness by measuring the film thicknesses during one 360° rotation of the reversing take-off means can be effected by way of the process computer 28 by appropriately correcting the take-off speed. For the automatic regulation of film thickness over the periphery of the film, the film thickness has to be measured at a number of peripheral segments of the tubular film corresponding to the number of cooling chambers and, if there are departures, the corresponding regulating valves 32, 32' have to be opened by way of the process computer.

In the illustrated regulating system, cooling chambers are provided for this purpose to eliminate the thin film portions.

To compensate the twist in the tubular bubble resulting from the reversing take-off apparatus 18, 19, the commencement of measurement can be retarded by a certain period in relation to the start of the reversing motion and the switching cams of the contact markers corresponding to the number of cooling sectors can be turned through a certain angle in relation to the film blowhead 3. The contact markers are the same in number and position with respect to the tubular film as are the cooling sectors 3''' of the film blowhead 3.

The conditions underlying the method will now be described in more detail with reference to FIGS. 5 and 6.

In FIG. 5, the conditions at the film bubble 25 are shown in a very simplified form along the section between the film blowhead 3 and the stationary measuring position 20 for the film thickness. The web of film 25 is shown as being tubular along the entire length. The flattened film guide by the reversing take-off 18, 19 can be neglected for these considerations. An imaginary thick portion 30 in the film leaves the film blowhead 3 for example on the left-hand side of the transverse axis of the head and is twisted through the angle $\alpha$ along the distance L between the blowhead 3 and the thickness measuring position 20 over the axis of the tubular bubble. In the plane of the measuring position 20, this corresponds to an angle $\beta$ after the distance L. The angles $\alpha$ and $\beta$ are derived from the velocity triangle composed of the take-off speed and peripheral reversing speed as related to the periphery of the tubular film. In FIG. 5, $\omega$ represents the angular speed of the to and fro reversing motion 18'. For example a switching cam (not shown) on the reversing apparatus 18 must be set back through the angle $\beta$ relatively to the reversing rotation and this switching cam actuates contacts (not shown) which are for example arranged in a circle and are provided in the same number and angular position as are the associated cooling chambers 3''' of the nozzle ring 3 (FIG. 4) which is cooled in peripheral regions. By means of this rotation of the switching cam, the measuring result is brought into the correct position in relation to the cooling chambers of the nozzle ring 3.

It is also possible to retard commencement of measurement in relation to the start of the reversing motion by the time it takes for the film to move from the film blowhead 3 up to the measuring position 20. To avoid the need for adjusting the correcting angle $\beta$ for the switching cam (not shown) upon reversal of the reversing rotation, measurement of the thickness by means of the thickness sensor 20 is desirably carried out only during the reversing rotation in one particular direction.

As already explained, the mean film thicknesses in the regions at the film periphery are formed by the process computer 28 from switching pulse to switching pulse corresponding to the number of cooling sections 3''' of the nozzle ring 3 and, upon departure from the desired film thickness, automatic operation of the cooling valves 32, 32' cools the cooling chambers 3''' in those peripheral regions in which the thin film portions were detected.

These conditions are again diagrammatically shown in FIG. 6 along one section of the flattened web of film 25'':

The imaginary thick portion 30 of film runs in one direction transversely to the length of the film and, after reversal of the reversing rotation, returns in the other direction. For the purpose of clarifying the conditions, the widths of the film 25'' are shown to a much larger scale than are the conditions in the longitudinal direction of the film. As explained previously, different thickness measuring methods can also be carried out with measuring heads which more rapidly traverse to and fro and in which the proper angular relationship of the part-periphery measurements in the film thickness must be transmitted in the correct position to the associated cooling sections 3''' of the nozzle ring 3. The film thickness measurement method as described using a thickness sensor in the marginal region of the flattened tubular film 25'' provides a measuring result during the time of one reversing rotation. However, the measuring time resulting from this is not disadvantageous because blown film extruder plants operate continuously during the day and night.

The method of the invention has been described for an example of a film blowing plant with a stationary blowhead and a reversing film take-off apparatus because the operating values required for the process control in this system are particularly easy to detect. However, it is also possible to transmit the described method to a film blowing plant in which the film blowhead reverses to and fro and the film take-off is stationary, the problems of the measured value detection and the command signals being necessarily transmitted in the same sense to the reversing film blowhead.

We claim:

1. A method of optimizing the output of a film blowing plant comprising an extruder, a film blowhead for blowing a tubular bubble, film calibrating means, reversing film take-off means and a coiler for flattened tubular film, by using a process computer controlling the film width and thickness, the method comprising: determining a desired value of the height of the line of solidification of the film above the blowhead, measuring the height of the line of solidification, and, according to the departure of the measured height from the desired value, increasing or reducing extruder output.

2. A method according to claim 1, characterised in that to determine the height of the line of film solidification the diameter of the tubular bubble is measured directly below the film calibrating means.

3. A method according to claim 1, characterised in that to determine the height of the line of film solidification the temperature of the wall of the tubular bubble is measured.

4. A method according to claim 1, characterised in that the film thickness is measured along the periphery of the tubular film and the associated region of nozzle ring of the film blowhead is influenced according to the departure from the mean film thickness.

5. A method according to claim 4, characterised in that influencing is effected by temperature changes.

6. A method according to claim 4 or claim 5, characterised in that commencement of measurement is retarded in relation to the start of reversing rotary motion of the take-off means by the time taken for the film to run from the blowhead to the point of measuring the film thickness.

7. A method according to claim 4 or 5, characterised in that the film thickness is measured only during reversing rotation of the take-off means in one direction.

8. A method according to claim 7, characterised in that the film thickness is measured only during reversing rotation of the take-off means in one direction.

9. A film blowing apparatus comprising:
an extruder;
film blowhead means connected to said extruder for forming a tubular bubble;
film calibrating means spaced from said film blowhead means for calibrating the tubular bubble;
take-off means for flattening the tubular bubble to form tubular film, one of said film blowhead means and said take-off means having a to and fro reversing motion;
coiler means for coiling flattened tubular film;
first measuring means for sensing and for generating signals representative of film width and thickness;
first means responsive to said measuring means for controlling film width and thickness;
means for determining a desired maximum spacing between said film calibrating means and said film blowhead means;
second measuring means for measuring and for generating signals representative of the height of the line of solidification of the tubular film above the film blowhead means; and
second means responsive to said second measuring means for comparing the measured height to the desired maximum spacing between said film calibrating means and said film blowhead means, said film calibrating means being adjustable with respect to said film blowhead means so that the spacing therebetween is adjustable and a portion of the film calibrating means is positionable in the vicinity of the line of solidification, said second means adjusting extruder output when the height of the line of solidification departs from the desired maximum spacing between said film calibrating means and said film belowhead means.

10. Apparatus according to claim 9, characterised in that said film blowhead means includes a nozzle ring provided with separately operable cooling sections along adjoining peripheral regions.

11. Apparatus according to claim 10, characterised in that the cooling sections consist of chambers through which a cooling medium flows.

12. Apparatus according to claim 10 or claim 11, characterised in that the nozzle ring is provided with at least twice as many cooling chambers as the blowhead means has distributor helices.

13. Apparatus according to claim 10 or 11, characterised in that said film blowhead means including inner and outer nozzle rings, and in that the cooling peripheral regions are provided only on the outer nozzle ring.

14. Apparatus according to claim 9, characterised in that said second measuring means includes sensing arms provided directly below the film calibrating means to measure the diameter of the tubular bubble.

15. Apparatus according to claim 12, characterised in that said film blowhead means includes inner and outer nozzle rings, and in that the cooling peripheral regions are provided only on the outer nozzle ring.

16. Apparatus according to claim 9, characterised in that said first and said second means comprise a process computer.

17. A method of optimizing the output of a film blowing plant comprising an extruder, a film blowhead, film calibrating means, film take-off means and a coiler for the flattened tubular film, one of the film blowhead and film take-off means having a to and fro reversing motion, the method using a process computer for controlling film width and thickness, the method comprising:
   determining a maximum height of the film calibrating means for a given set of process conditions;
   measuring the height of the line of solidification of the film above the blowhead;
   positioning a portion of the film calibrating means in the vicinity of the line of solidification; and
   changing extruder output based on the departure of the position of the film calibrating means from the determined maximum height.

* * * * *